United States Patent [19]
Borowski et al.

[11] Patent Number: 5,359,667
[45] Date of Patent: Oct. 25, 1994

[54] METHOD FOR IDENTIFYING AND TRACKING DOCUMENT CHARACTERISTICS IN A DOCUMENT IMAGE PROCESSING SYSTEM

[75] Inventors: Edward F. Borowski, Lathrup Village; Lawrence P. Del Ricci, South Gate; Norman P. Kern, Birmingham, all of Mich.

[73] Assignee: Unisys Corporation, Blue Bell, Pa.

[21] Appl. No.: 934,821

[22] Filed: Aug. 24, 1992

[51] Int. Cl.⁵ .............................................. G06K 9/00
[52] U.S. Cl. ............................................ 382/7; 382/61
[58] Field of Search ............... 382/7, 61, 13; 235/454; 364/406; G06K 9/00, 9/20, 7/10, 7/14; G06F 15/00

[56] References Cited

U.S. PATENT DOCUMENTS

| | | |
|---|---|---|
| 4,264,808 | 4/1981 | Owens et al. |
| 4,685,141 | 8/1987 | Hoque et al. ............................. 382/7 |
| 4,813,077 | 3/1989 | Woods et al. ............................. 382/7 |
| 5,040,226 | 8/1991 | Elischer et al. .......................... 382/7 |
| 5,119,433 | 6/1992 | Will .......................................... 382/7 |

Primary Examiner—Yon J. Couso
Attorney, Agent, or Firm—LeRoy D. Maunu; Charles A. Johnson; Mark T. Starr

[57] ABSTRACT

A method for summarizing document characteristics of documents processed by a document image processing system so that the document characteristics can be quickly identified and analyzed. Document characteristics are stored in an audit file for each document processed as the document is processed by the system so that the document characteristics can be summarized and analyzed at a later time. An analyzer processes a request for an analysis of document characteristic data. The analyzer provides a summary of information stored in the audit file in combination with results of previous summaries which have been accumulated in a history file. The analyzer accumulates information stored in the audit file for classes of documents. The accumulated information is then merged with information stored in the history file. During the merge process, information the history file is updated and information for the summary is accumulated.

2 Claims, 11 Drawing Sheets

CHECK ITEM ANALYSIS —402

HISTORY CAR ANALYSIS REPORT    Date mm/dd/yy    Page n

| ACCOUNT # | #ITEMS | #ITEMS WITHIN WORK TYPE | %OF ITEMS | %ITEMS CAR WAS REQUESTED | %CAR READS | %CAR REJECTS | %CAR REJECTS WITH LOC PROVIDED | CAR LOCATION DATA | | | |
|---|---|---|---|---|---|---|---|---|---|---|---|
| | 410 | 412 | 414 | 416 | 418 | 420 | 422 | UPPER 426 | LOWER 428 | LEFT MOST 430 | RIGHT MOST 432 |
| UNENCODED 404 | 408 | | | | | | | | | | |
| 0720-2378/12345 | nn | nn | nn.nn | nn | nn.nn | nn.nn | nn.nn | nn | nn | nn | nn |
| 0724-2267/448956 | nn | nn | nn.nn | nn | nn.nn | nn.nn | nn.nn | nn | nn | nn | nn |
| ENCODED 406 | 408 | | | | | | | | | | |
| 0720-1234/33256 | nn | nn | nn.nn | nn | nn.nn | nn.nn | nn.nn | nn | nn | nn | nn |
| 0724-0405/220945 | nn | nn | nn.nn | nn | nn.nn | nn.nn | nn.nn | nn | nn | nn | nn |

FIG. 12

METHOD FOR IDENTIFYING AND TRACKING DOCUMENT CHARACTERISTICS IN A DOCUMENT IMAGE PROCESSING SYSTEM

CROSS REFERENCE TO CO-PENDING APPLICATIONS

The present application is related to the following U.S. patent applications:

1) U.S. Pat. No. 5,120,944, entitled "Image-Based Document Processing System", and filed Oct. 10, 1989;

2) Ser. No. 07/600,777 pending, entitled "Enhanced Automatic Data Reading", and filed Oct. 19, 1990; and 3) Ser. No. 07/709,533 pending, entitled "Means and Methods for Selectively Storing Images and Related Data Relevant to Automatic Data Reading Errors in a Document Processing System", and filed Jun. 3, 1991. All of the above named U.S. patent applications are assigned to the assignee of the present invention and are incorporated herein by reference.

BACKGROUND OF THE INVENTION

The present invention relates generally to document image processing systems, and more particularly to document image processing systems which process documents whose format may vary.

Today's financial services industry is facing the challenge of processing immense numbers of documents efficiently. Predictions that document payment methods would decline have not been realized. In fact, document payment methods have grown worldwide and are expected to continue to increase. Thus, there is a vital need to devise improved means and methods for processing such documents. The use of imaging technology as an aid to document processing has been recognized as one way of significantly improving document processing, as disclosed for example in U.S. Pat. Nos. 4,264,808 and 4,813,077, and European Patent EP 0 344 742 A2.

Generally, imaging involves optically scanning documents to produce digitized images that are processed electronically and stored on high capacity storage media (such as magnetic disk drives and/or optical memory) for later retrieval and display. It is apparent that document imaging provides the opportunity to reduce document handling and movement, since these electronic images can be used in place of the actual documents.

One feature of imaging systems is the capability to automatically read data from the image. Where the data can be machine read, manual entry is unnecesary and overall document processing throughput may be thereby increased. In applications where the documents processed are of uniform size and shape and the data is consistently located in a predetermined position on the document, the automatic reading of the data is simplified; minimal or no searching is necesary in the automated read operation. In contrast, applications where the documents processed vary in size, shape, and data location, the automatic reading of data is complicated by the fact that the desired data must be located before it can be read.

These variations in document format can substantially impact the cost effectivness of automated document image processing systems. If the effect of the document format variations is that the data cannot be found, then the data cannot be automatically read; if the data cannot be automatically read, it must be manually entered by an operator; if an operator is required to manually enter the data, the desired costs savings soon evaporate.

The problem of document format variations manifests itself when the number of documents for which the data was successfully read is small relative to the total number of documents processed. This figure is typically referred to as the success-rate. If the success-rate falls below a certain level, the automatic document processing system will cease to be cost effective (the level will vary from application to application).

Bank check processing systems are exemplary of applications where the document formats are prone to significant variations. The size, shape and data location may vary from check to check as well as from bank to bank. In addition to the size, shape and data location variations, the following two examples illustrate other document format variations encountered by banks.

First, is the foodstamp. On a foodstamp, there are two amounts on the document. One is the limit on the amount for which the stamp can be redeemed, and the second is the amount for which the stamp was actually redeemed. Often times these two amounts are not the same. Depending upon where the amounts are located, the automatic reader may read the maximum amount instead of the actual amount. Documents of this nature must be identified so that either the data can be manually entered or the proper data location can be provided to the automatic amount reader.

The second example where an automatic reader may encounter difficulties in reading the data from an exemplary check is a check which has a "$" that does not line up horizontally with the printed amount. This may occur when the checks are not adequately aligned in the printer which prints the checks. Because the "$" is used in locating the amount on a check, a misalignment between the "$" and the amount may cause the automatic reader to reject the document, thereby forcing a manual entry of the amount. If those documents whose amounts are misaligned can be identified, the search parameters for the automatic reader can be changed to search for locater character other than a "$", such as an "*", in locating the amount.

One way in which the foregoing difficulties are addressed by check processing systems is by providing the coordinates on the MICR code line at which the desired data on the document was located, as illustrated by U.S. Pat. No. 4,685,141. This approach is useful, but the problem remains that before the coordinates can be provided on the MICR code line the document must be surveyed to determine the correct coordinates. If each check supplier could be convinced to magnetically encode the data location coordinates on the bottom of the check this may be feasible. However, while some check suppliers may cooperate in such an effort, others may not. Furthermore, if a document format was changed, the document image processing system would have to rely on the check supplier to make the corresponding change to the MICR code line. Thus, for a document image processing system to rely on the cooperation of check printers for its success-rate would be risky. It would be more desirable for each particular document image processing system to have available current document format information based upon its recent processing activities, thus providing the capability to quickly adapt the system to a change in document format.

One way to identify current document format information for a document image processing system is to survey the documents before processing them. While surveying documents may be practical in some applications, in check processing applications this is not the case. In check processing systems, millions of documents need to be processed each day. The task of identifying document format information by sampling the documents processed would be overwhelming. Furthermore, the physical documents may not be available for examination for more than a short period of time. Therefore, surveying the checks after running them through the check processor would also be impractical. Alternatively, providing additional storage capacity for storing document images for later examination will not be cost effective where there are millions of documents processed.

The problems posed to document image processing systems by document format variations continue even after most document format features have been identified. As discussed earlier, document formats occasionally change. If the document processor is programmed to expect one document format for a particular document, for example one check format for a particular account, and the document format changes, the success rate for the particular document may decline significantly. Using the check example, if the check happens to be drawn on an account which typically issues a large number of checks, the overall system success-rate may also decline significantly because of the failed reads for the particular account. Thus, it is desirable to continually monitor the system sucess-rate and correlate the success-rate with the document formats.

SUMMARY AND OBJECTS OF THE INVENTION

Objects

It is therefore an object of the present invention to provide an automated method for surveying document characteristics so that a document image processing system can be programmed to quickly process particular documents.

It is a further object of the present invention to provide an automated method for identifying sets of documents processed by the document image processing system whose occurance rate is relatively high.

It is another object of the present invention to provide an automated method for identifying document characteristics for selected sets of documents, wherein the identified document characteristics can be used to enhance the performance of the document image processing system.

It is a further object of present invention to automatically provide location information for a selected set of documents, wherein the location information is a summary of the positions at which the predetermined pieces of data on the document images were found.

It is also an object of the present invention to automatically provide document characteristics for selected sets of documents whose occurance rate exceeds a predetermined threshold.

It is still a further object of the present invention to automatically provide an indication when the document characteristics the document image processing system uses in processing a selected set of documents, is not reflective of the actual document characteristics for the selected set of documents.

Summary of the Invention

In a particular preferred embodiment of the present invention, a system is provided for surveying document characteristic data in a document image processing system so that the performance of automatic data reading from the document image can be enhanced. The automated method provided by the present invention enables an analyst to have the document characteristic data available without the added burden and expense of a manual survey of documents. The automated method further provides for a quick analysis of those documents likely to be adversely affecting system performance.

For each document processed by the document image processing system, selected characteristics are stored in an audit file. The stored document characteristics are saved for analysis at a later time. An analyst may periodically request a summary of information concerning the stored characteristics of documents processed by the image processing system. The analyst makes this request to an analyzer program.

The analyzer uses two sources of information in providing the summary to the analyst. The first source of information is the audit file, and the second is a history file. The history file contains information accumulated by the analyzer program over previous invocations of the analyzer program.

The analyzer first accumulates information based upon the data available in the audit file. Then the accumulated information is merged with the information stored in the history file. During the merge process, information the history file is updated and information for the final report is accumulated. Once the report information has been accumulated, the report is displayed to an analyst.

The foregoing objectives and summary will become apparent from a consideration of the Drawings and the following detailed description of the preferred embodiment of the invention.

BRIEF DESCRIPTION OF THE DRAWINGS

FIG. 12 is the report format showing statistical data for example subclasses of documents processed by the exemplary system.

DETAILED DESCRIPTION

Like numerals and characters refer to like elements throughout the figures of the drawings.

Figure 6:
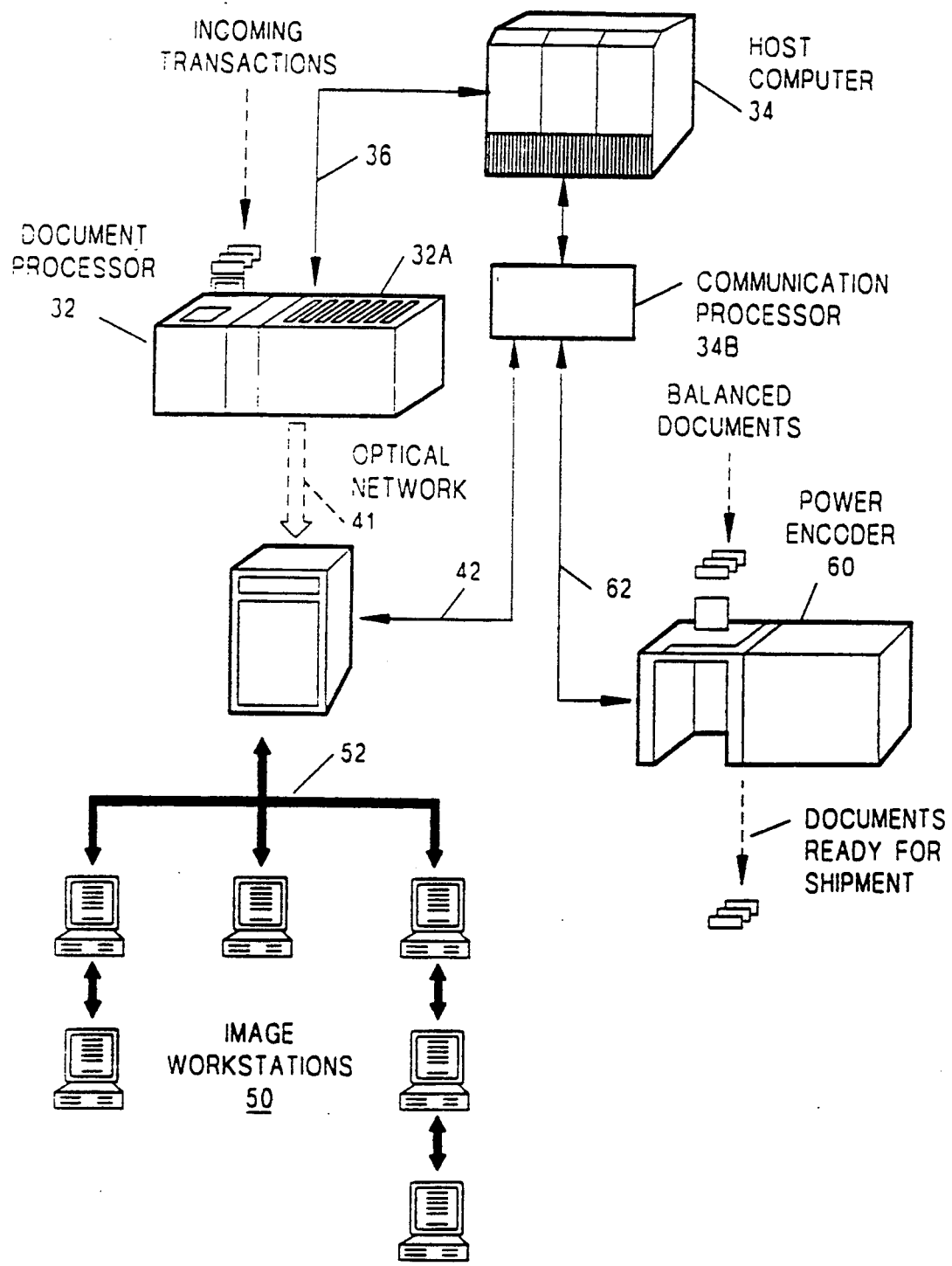
FIG. 6 generally illustrates an exemplary image-based bank check processing system in accordance with the present invention.

In order to understand how the invention may be implemented and operated, an exemplary image-based bank check processing system, such as generally illustrated in FIG. 6, will be considered. It should be understood that this exemplary system is merely illustrative, and should not be considered as in any way limiting the scope of the invention, since the invention is applicable to other types of document processing systems, financial and otherwise.

Deposit Transactions

Before describing FIG. 6, it will be helpful to consider the deposit type of transactions Which this exemplary system will be assumed to process for the purpose of this description.

As is well known, a very common activity within a bank involves the processing of deposits made by the bank's customers. A customer is typically one who has a checking account at the bank and, from time-to-time, makes a deposit for the purpose of depositing to her account one or more checks which the customer has received from others. These checks may be drawn on the same bank (on us checks) or on other banks.

Figure 1:
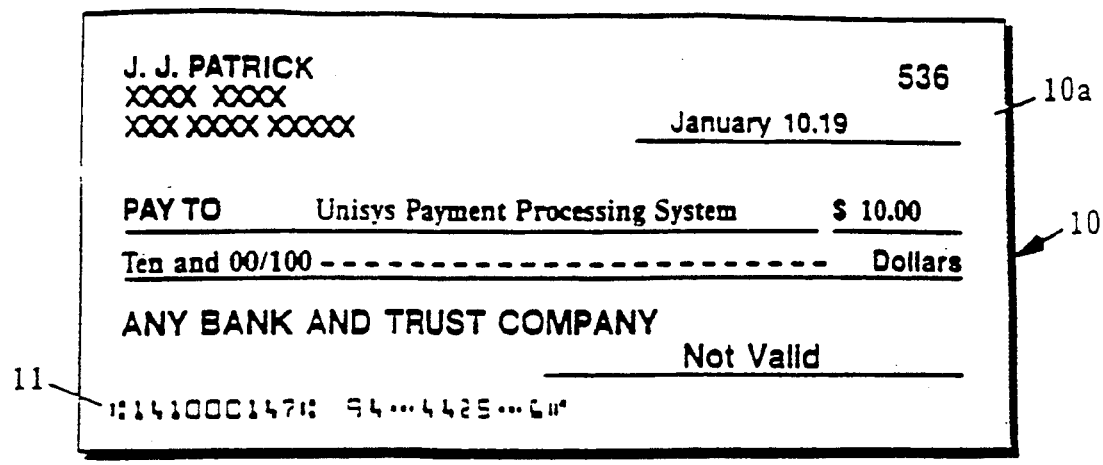
FIG. 1 illustrates the front side of a typical check.

FIG. 1 illustrates the front side 10a of a typical Check 10. In order to make a deposit, the customer ordinarily fills out a deposit ticket listing the amount of each check to be deposited, and the total of all checks.

Figure 2:
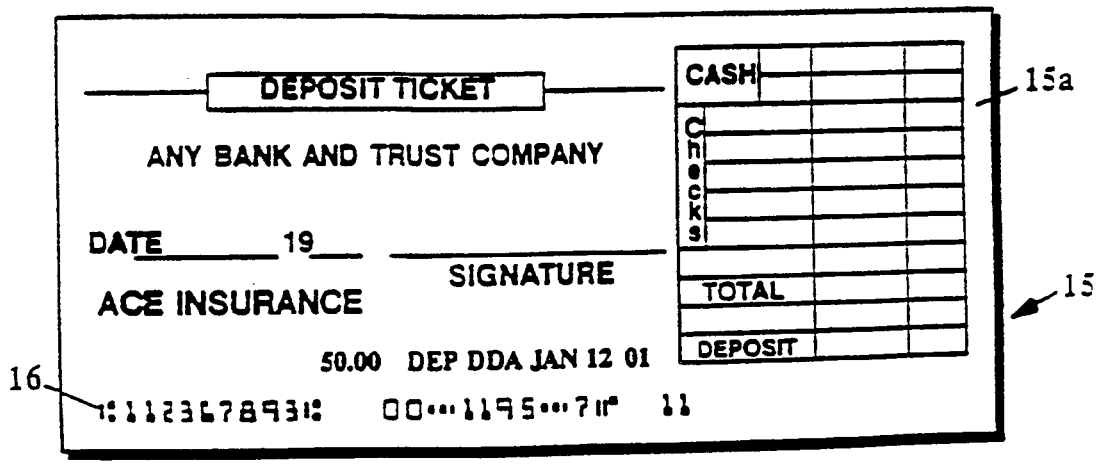
FIG. 2 illustrates the front side of a typical deposit ticket.
Figures 3, 5:
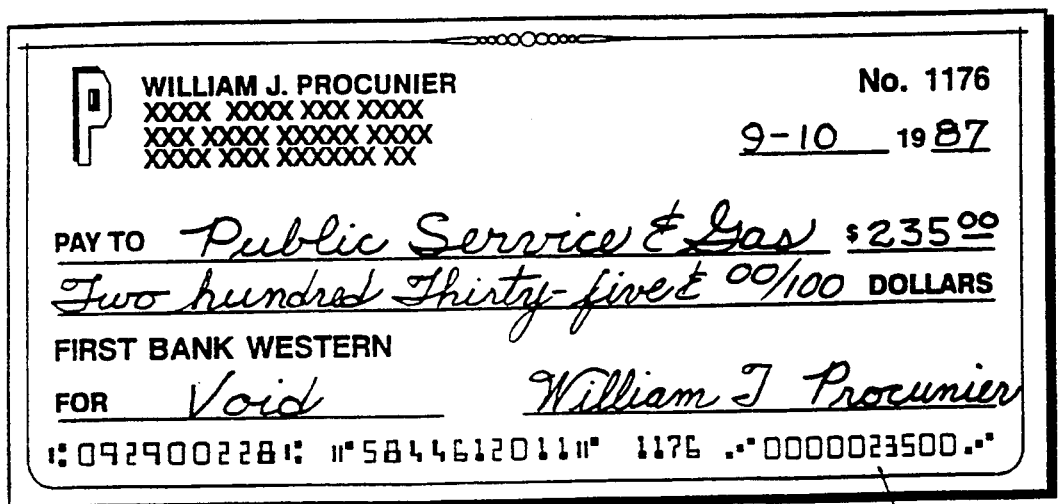
FIG. 3 illustrates the back side of a typical desposit ticket.
FIG. 5 illustrates a typical check containing an encoded amount below the signature.

FIG. 2 illustrates the front side 15a of a typical Deposit Ticket 15. FIG. 3 illustrates the back side 15b of the desposit ticket 15. If there are many checks to be deposited and insufficient space to list them on the front side 15a of the Deposit Ticket 15, the check amounts are then listed on the back side 15b of the Deposit Ticket 15, with the total of these checks being written on the back 15a and also on the front side 15a of the Deposit Ticket 15.

Note that code lines 11 and 16 are provided at the bottom of the front sides 10a and 15a of both the Check 10 and Deposit Ticket 15, respectively. These code lines 11 and 16 typically are both humanly-readable and machine-readable, and contain information which the bank uses for processing, such as the bank on which the document is drawn, a routing/transit number, the account number of the person who wrote or made out the check or deposit ticket, and a transaction code indicating the type of document. These code lines 11 and 16 are usually comprised of well known MICR (Magnetic Ink Character Recognition) data, but may alternatively be OCR (Optical Character Recognition) data. For convenience, it will be assumed for the remainder of this description that these code lines are MICR data.

Figure 4:
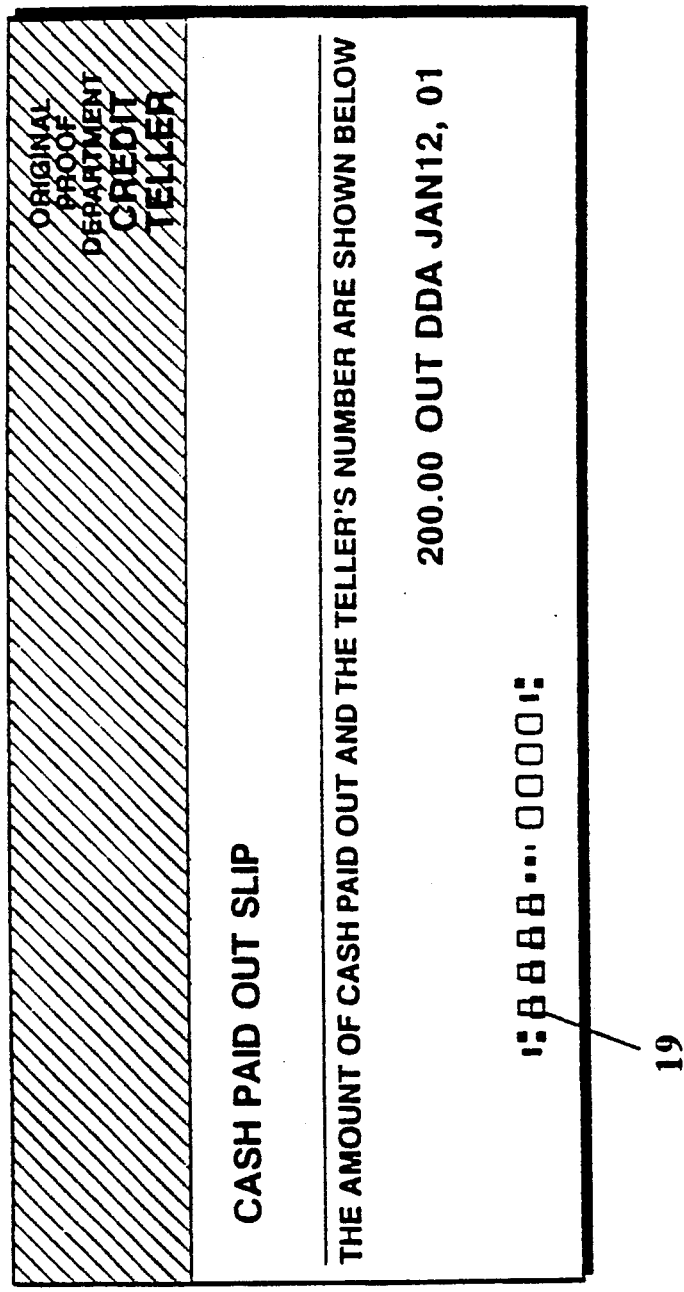
FIG. 4 is an example of a Cash Paid Out Slip.

FIG. 4 is an example of a Cash Paid Out Slip. A bank receives deposit tickets and associated checks for further processing from a variety of sources, such as from the bank's tellers, through-the-mail, from automated teller machines, etc. When the transaction is made at a teller window, the customer may also choose to receive a certain amount of cash, as indicated by the $200.00 amount provided on the "less cash received" line on the front side 15a of the Deposit Ticket 15 in FIG. 2. In such a case, the teller will then include with the check(s) and deposit ticket of the transaction, a cash paid out slip for the corresponding cash amount of $200.00, as illustrated as an "Incoming Transaction" in FIG. 6. This cash paid out slip also has a MICR code line 19. Instead of receiving cash, the customer might wish to deposit cash into his account, in which case the customer would enter the appropriate amount into the "currency" and/or "coin" lines adjacent the "cash" block on the front side 15a of the Deposit Ticket 15 (FIG. 2). The teller would then include with the check(s) and deposit slip of the transaction, a cash paid in slip (not shown), which would be generally similar to the cash paid out slip shown in FIG. 4 (including an appropriate code line), except that it would designate cash paid in instead of cash paid out.

The Deposit Ticket 15 along with its associated Checks 10, and any cash paid in or paid out slip constitute a transaction. Other documents, such as mortgage and credit card payments could also be included in a transaction. Assuming no errors have been made (by either the customer or the teller), the "net deposit" line on the front side 15a of the Deposit Ticket 15 should equal the algebraic sum of the associated check amounts and any cash paid in or paid out amount, and also the amounts of any other types of transaction items which may be included in the transaction. When this equality is present, the transaction is said to be "balanced."

It will be appreciated that a bank is required to process large quantities of transactions, such as described above, every working day. The bank needs to process these transactions for two primary purposes:

(1) To capture data from the transaction documents in order to be able to update the bank's own customer accounts. For example, a customer who made a deposit needs to have his account updated to reflect the results of the deposit.

(2) To send out checks drawn on other banks for collection. In accordance with current banking practices, it is required that a machine-readable amount be encoded on each check which for the present description will be assumed to be MICR data. This encoded amount is conventionally placed below the signature of the person who wrote the check, in line with the check code line 11, as illustrated at 21 in FIG. 5. It will be assumed that MICR encoding is used.

General Document Image Processing System Description

Figure 7:
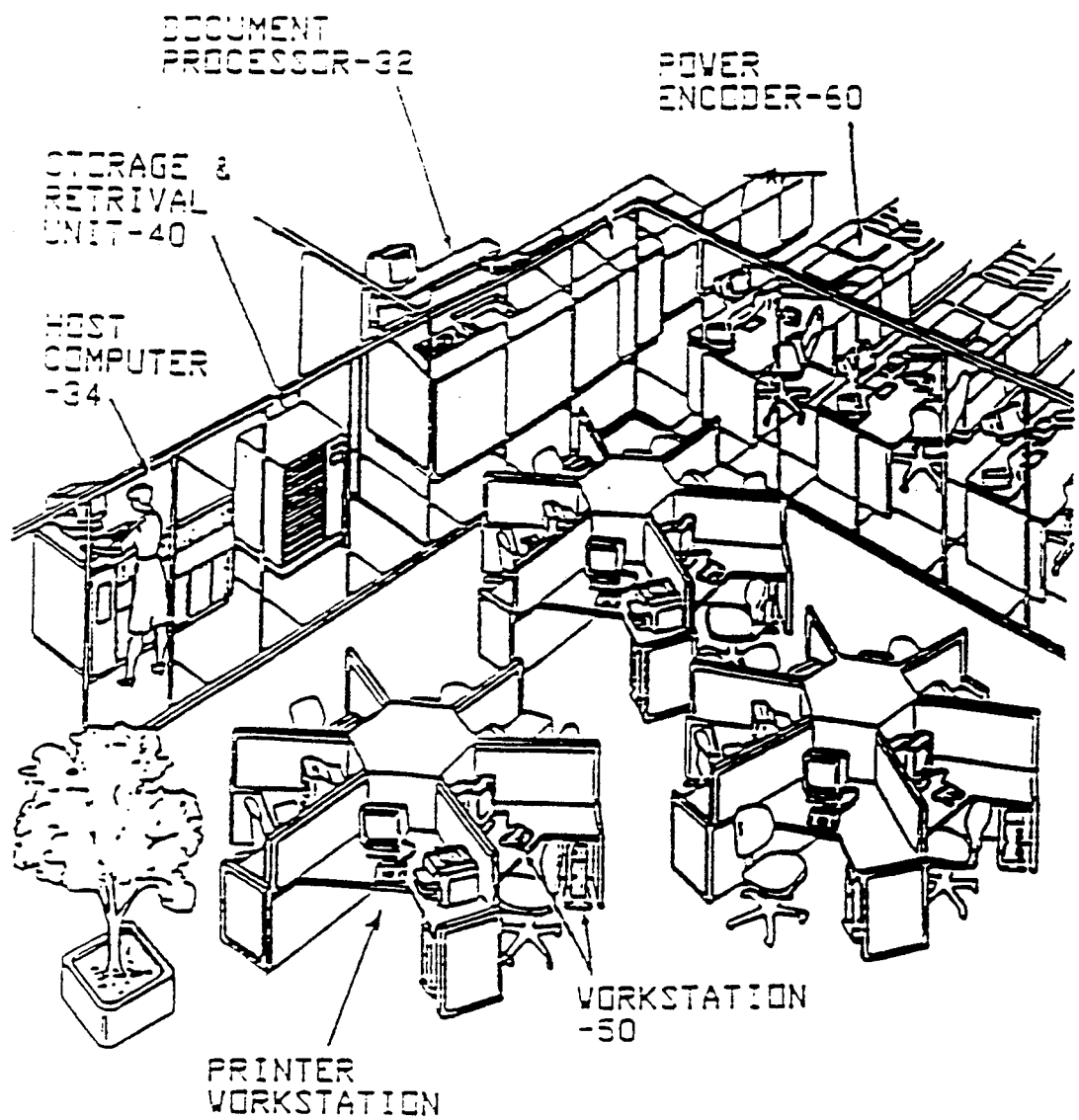
FIG. 7 is a pictorial representation of FIG. 6.

FIGS. 6 and 7 illustrate an exemplary embodiment of an image-based bank check processing system in which the present invention can be used to assist an analyst in enhancing overall system performance.

An initial step of preparation is required to prepare incoming transactions for processing by the check processing system of FIG. 6. This preparation step involves removing staples, paper clips, rubber bands etc. from the transaction document, and arranging them in trays with proper orientation and in proper order, each tray corresponding to a block. Included in each tray is a block ticket for identifying the documents in that block, and pocket separators for separating the documents into block groups after they have been sorted into Pockets 32a. For the purposes of this description, and, by way of example, it will be assumed that a tray comprises a block of transactions containing about 3,000 documents, and without any transactions being split up between different blocks. To permit identification of the documents associated with each transaction, they are arranged in consecutive order in the tray. Typically, the deposit ticket of each transaction precedes the other documents of the transaction.

These tray blocks of transactions are brought to a high speed Document Processor 32 which includes an imaging capability, and also optically includes a microfilming capability and a capability for automatically reading the dollar amounts of the transaction documents. The operator places the tray block into an automatic document feeder of the Document Processor unit 32 and begins operation. The Document Processor 32 then reads the MICR code line on each document as the document flows through the unit, endorses audit trail information (including assigning a sequence number) on the document, optionally microfilms the document, and also captures an image of one or more sides of the document. If a document already has the dollar amount encoded, or if automatic dollar amount reading is available, this dollar amount is also read. The Document Processor 32 then sorts the documents (usually based on MICR data) to Pockets 32a using a sort pattern which may be downloaded from a Host Computer 34 via a Communications Processor 34a and a Communication Link 36. As will become evident hereinafter, it is advantageous to sort to Pockets 32a based on the destination indicated by the MICR code line in order to facilitate meeting destination shipment deadlines. As will also become evident hereinafter, it is additionally advantageous to permit a defective MICR code line to be sorted to its corresponding pocket, so long as the destination portion is readable. The manner in which such documents having defective MICR code lines, but with readable destinations are handled will be described later herein. Documents which cannot be handled (e.g., because of a defective MICR line without readable destination) are sorted to a reject pocket for handling by conventional reject reentry procedures. If desired, deposit slips and cash-in and cash-out slips could also be sorted to separate pockets.

The data read from the transaction documents by the Document Processor 32 are fed to the computer 34 via Communication Link 36, and typically includes each document's MICR data, amount data (if read), assigned sequence number and pocket location. The Host Computer 34 maintains a data base which stores the pertinent data corresponding to each transaction document being processed.

Images captured by the Document Processor 32 are processed, compressed, and formed into image packets. Each packet comprises one or more compressed images of a document along with an identifying header containing document identification data (such as MICR data and sequence number). These image packets are then sent, via a high speed, point-to-point optical network 41 for storage on a high capacity disk-based magnetic storage and retrieval unit 40. The storage and retrieval unit 40 communicates with the computer 34 via Communication Link 42 and communication processor 34a.

Thus, after a tray block is passed through the Document Processor 32, the transaction documents will be in the Pockets 32a, corresponding document data, such as MICR, sequence number, dollar amount (if read) and pocket location will have been sent to the Host Computer 34 for storage in its document data base, and corresponding images with document identifying headers will have been stored on the storage and retrieval unit 40.

Additional tray blocks are processed by the Document Processor 32 in the same manner as described above. In each pocket, the pocket separator tickets provided in the trays during the previously described preparation step serve to separate documents from different blocks. As pockets fill, an operator empties each pocket into a pocket tray which is identified with the corresponding pocket number. These pocket trays are moved to a holding area. When the system indicates that the documents in a particular pocket tray are ready for encoding, the tray may then be taken to a Power Encoder 60 for high speed encoding of the dollar amount on each check. FIG. 5 illustrates a Check 10 having a MICR-Encoded Amount 19 below the checkmaker's signature. Since, as mentioned previously, the sorting into pockets is advantageously based on shipping destination, these trays corresponding to destinations having the earliest deadlines, and which the system indicate are ready for encoding, can be encoded before those having later deadlines. In the system being described encoding of the dollar amount by a Power Encoder 60 is normally permitted only after the dollar amounts of all documents in a tray have been entered into the computer data base and, in addition, all corresponding transactions have been determined to be properly balanced. Batch and/or block balancing may additionally be provided as a further check on proofing accuracy.

Of course, before a transaction can be balanced, the dollar amounts of its documents must be entered into the computer data base. The images of those documents which still require dollar amount entry after being processed by the Document Processor 32 are sent by the storage and retrieval unit 40, via a local area network 52, to image workstations 50.

As shown in FIG. 6, the illustrated system includes a plurality of image workstations 50 which, in response to receiving images from the storage and retrieval unit 40, serve as the primary operator interface for entering dollar amounts and correction data into the computer data base, and for balancing transactions. The workstations 50 communicate with the computer 34 via network 52 and the storage and retrieval unit 40. Accordingly, data generated at the workstations 50 is sent to the computer 34 by first sending the data, via network 52, to storage and retrieval Module 40, which then sends the data, via network 42 and communication processor 34a to the computer 34.

The workstations 50 are divided by function into various types: one type of workstation is used to key in dollar amounts by viewing document images; a second type provides for the correction of MICR code lines, while also providing for amount entry if required; a third type is used to balance transactions; and a fourth type cooperates with a printer to provide text and image hard copy output.

When the transactions corresponding to the documents in a pocket tray which requires encoding have been determined to be balanced, the pocket tray may then be taken from the holding area to the Power Encoder 60, which communicates with the computer 34 via Communication Link 62 and communication processor 34a. An operator places the documents from the tray into the input hopper of the Power Encoder 60 and initiates operation. As the documents pass through the Power Encoder 60, each pocket separator signals the computer 34 to send to Power Encoder 60 the amount data for the sequence of checks which follows the pocket separator. The Power Encoder 60 then encodes the sequence of checks accordingly, using an appropriate printer (not shown). The Power Encoder 60 may also provide for further sorting of checks based on, for example, destination data contained in the MICR code line, or in response to sorting data derived from the Host Computer 34. The checks are thus made ready for shipment to their appropriate destinations. Any checks rejected by the Power Encoder 60 are added to their respective group for shipping. The sorting may also be used to remove other types of transaction documents (such as pocket separators, deposit tickets and cash-in and -out slips) by sorting them to separate pockets. Typically, a cash letter accompanies each shipped group indicating the number and amount of the checks in the group.

It will be remembered from the previous description of the Document Processor 32 in FIG. 6 that it includes the capability of automatically reading a courtesy amount contained on a document, such as, for example, the "$10.00" machine-printed amount shown on the check in FIG. 1, and the "$235.00" handwritten amount shown on the check in FIG. 5. The ability to automatically read such amounts is, of course, of very significant advantage, since it avoids the need for an operator at a workstation 50 to view the document image in order to enter the amount into the data base maintained in the Host Computer 34. In other words, for every document whose amount is automatically read, there is a corresponding reduction in the number of documents requiring entry by an operator. In the preferred embodiment, provision is made to assist an analyst in enhancing the benefits derivable from automatic amount reading.

Specific Description of the Invention

Having generally described the exemplary check processing system of FIG. 6, a specific description of the present invention will next be considered.

Figure 8:
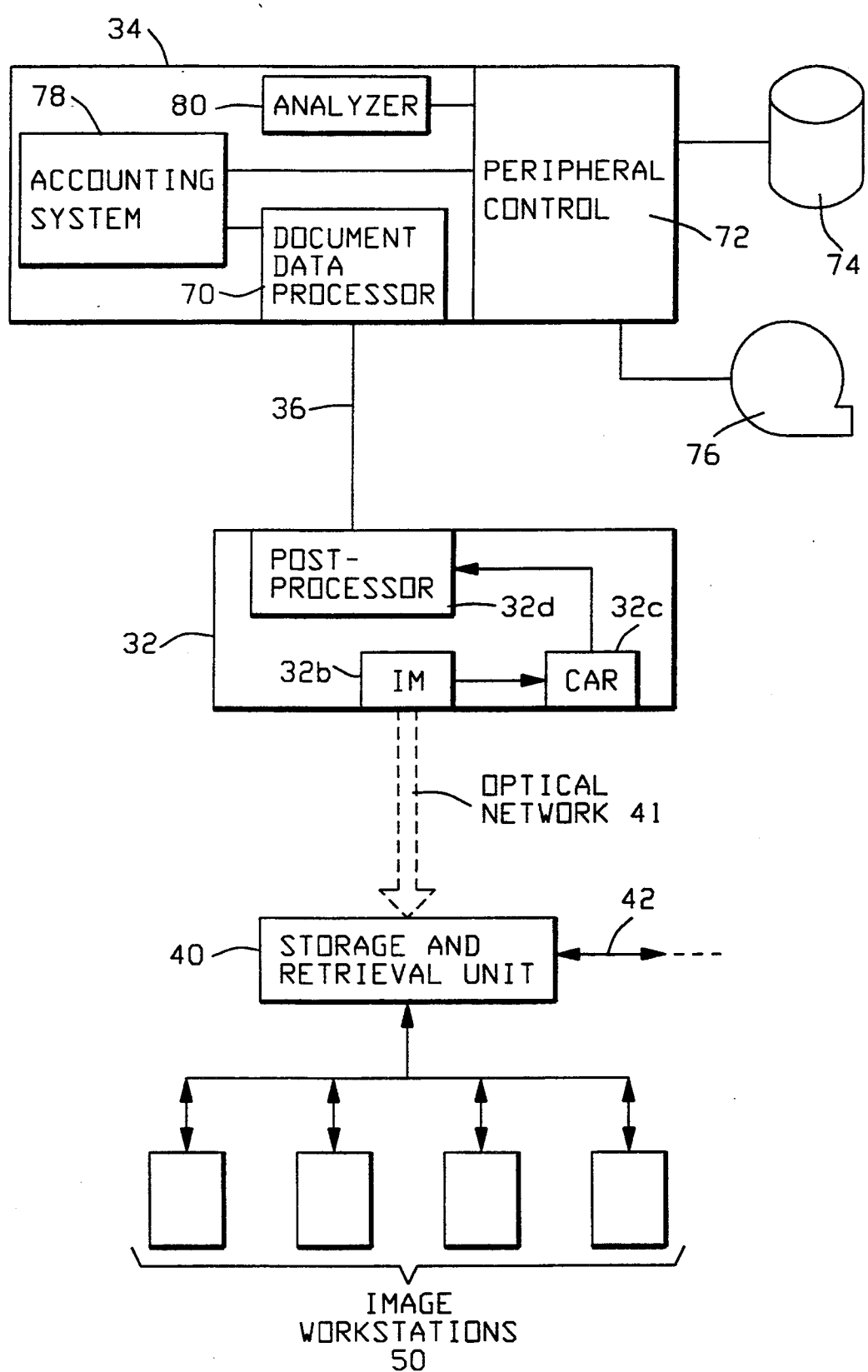
FIG. 8 illustrates portions of the system of FIG. 6 which will be considered in describing the present invention.

FIG. 8 illustrates portions of the system of FIG. 6 which will be considered in describing the present invention. The Document Processor 32 includes an Image Module 32b and a Courtesy Amount Reader 32c. The Image Module 32b provides for capturing document images, processing and compressing the captured images, and then transmitting the compressed images via optical network 41 to the storage and retrieval unit 40. The Image Module 32b also provides appropriately processed image data to the Courtesy Amount Reader 32c, which attempts to find and read the printed or handwritten courtesy amount. As is well known in the financial industry, the courtesy amount comprises the numerical digits ("$10.00" in FIG. 1 and "$235.00" in FIG. 5) often provided to the right of the payee line.

The Courtesy Amount Reader 32c uses well known character recognition techniques for reading the courtesy amount from the image data provided by the Image Module 32b. In addition to the the amount read from the image, the Courtesy Amount Reader 32c provides information such as a primary and secondary choice for each character in the amount field, coordinates defining the area on the image where the amount was found, and confidence levels associated with each character in the amount. This additional information is then sent to the Post-processor 32d for further processing. The Post-processor 32d takes the additional information and merges it with the MICR data read by the Document Processor 32. Once merged, the data is sent to the Document Data Processor 70 on the Host Computer 34 for further processing.

The operations of the Image Module 32b and the Courtesy Amount Reader 32c are performed as the documents are being sorted by the Document Processor 32. The Courtesy Amount Reader 32c is able to complete the necessary reading of data very shortly after the documents are sorted. Performance of the Courtesy Amount Reader 32c can be enhanced by providing a location within the image where the data to be read is expected to be located. If the Courtesy Amount Reader 32c has a location from which to read data, it can eliminate the processing required to scan the image in order to locate the desired data, thereby enhancing overall performance. Therefore, in the exemplary system it is desirable to track the data location information as a document characteristic.

The data read from the transaction documents by the Document Processor 32 are fed to the Host Computer 34 via Communication Link 36, and typically includes each document's MICR data, amount data (if read), assigned sequence number, pocket location, and other assorted document characteristics. The Document Data Processor 70 on the Host Computer 34 receives the data read from the document by the Document Processor 32. The Document Data Processor 70 maintains an audit file which contains selected data corresponding to each document processed. As such, the Document Data Processor 70 is coupled to Peripheral Control 72 which controls storage and retrieval operations for Disk Unit 74 and Tape Unit 76, either of which could be used for long term storage of the audit file.

The exemplary system of FIG. 8 further includes an Accounting System 78 which maintains the account information for the bank's customers. The deatils of the Accounting System are not germain to the present invention, but it is shown to illustrate the system in which the present invention could be used. In the exemplary system credit and debit information is sent to the Accounting System. It should be noted that the Accounting System 78 may reside on either the Host Computer 34, or a different data processing system dedicated to the accounting function.

Analyzer Module 80 provides data to the system analyst which can be used to enhance the performance of Document Processor 32. As was described earlier, the Image Module 32b in FIG. 8 provides an appropriately processed image to the Courtesy Amount Reader 32c, which attempts to read the printed or handwritten courtesy amount from a check type document. The information the Image Module 32b supplies to the Courtesy Amount Reader 32c includes parameters which aid the Courtesy Amount Reader in quickly retrieving the desired data. One piece of information which is particularly useful to the Courtesy Amount Reader is the expected location of the required data on the image. Through analaysis of the historical data kept and reported by the Analyzer 80, the Image Module 32b can be programmed to use a look-up table to find the data location information for selected document types. If the Image Module 32b detects that the image it is sending to the Courtesy Amount Reader 32c is a particular document type (for example, a particular account number as indicated by the MICR code line), the Image Module 32b can look-up the associated location information and send it along with the image to the Courtesy Amount Reader 32c. The Courtesy Amount Reader 32c can then begin searching for the desired data at the specified location rather than spending valuable processing time trying to locate the data on the image. The key then is identifying the appropriate information to provide the Image Module for a particular document type. This information is provided by the present invention.

It should be noted that although this invention is discussed in the context of an image processing system in which the capabililty to automatically read data is currently in use, it will be recognized that the spirit of the invention is equally applicable to systems which do not have the capability to automatically read data, but may be planning to add it in the future. For example, before a bank adds the automatic data reading capability to its system, it may be beneficial to identify those accounts which typically issue a relatively large number of checks. Once identified, the bank could analyze the necessary documents to obtain the desired document characteristics. Upon adding the automatic data reading capability to their check processing system, the document characteristics could be provided as configuration data to the system.

Figure 9:
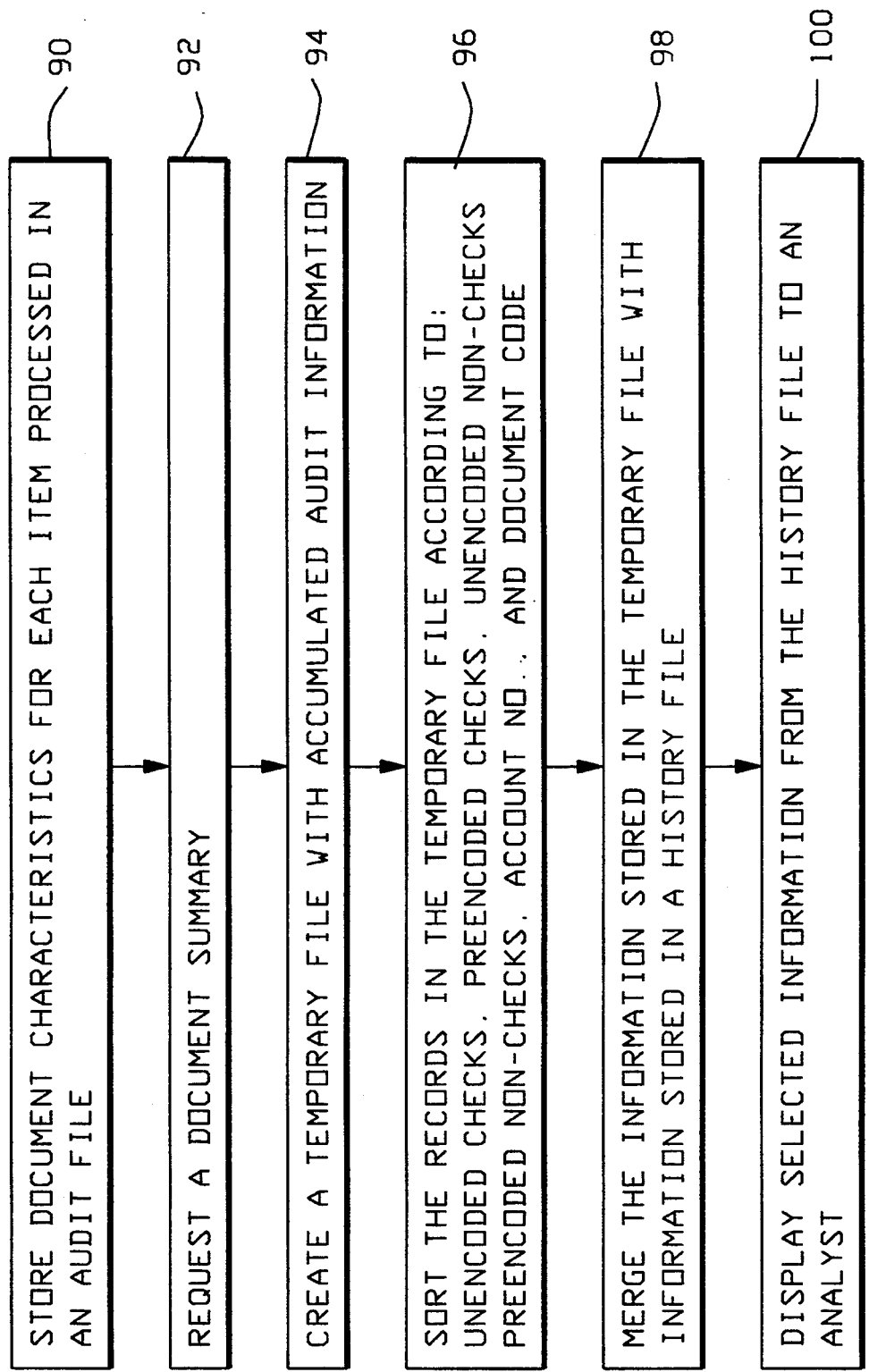
FIG. 9 is a flow chart of the overall processing of the present invention.

FIG. 9 is a flow chart of the overall processing of the present invention. Operation 90 stores document characteristics in an Audit File for each document processed. The stored document characteristics consist of those characteristics returned from the Document Processor 32. Thus the storing or "archiving" process takes place as documents * are processed through the system and no manual identification of document characteristics is necessary. The stored document characteristics are saved for analysis at a later time and are therefore stored on a nonvolatile storage medium, such as a magnetic tape or disk. A more detailed discussion of the data stored in the Audit File is included in the description accompanying FIG. 10.

Operation 92 entails requesting that the analyzer provide a summary of document characteristics for the documents processed. The analyst making the request has the option of choosing either a "daily report" or a "history report". The daily report contains a summary of document characteristics relating to documents which have been processed by the Document Data Processor 70 since the last report request was made. Whereas the history report contains a historical document class summary which contains information relating to all documents which have ever been processed by the Document Data Processor 70. One instance where the summary request of Operation 92 would be requested is when there has been a noticeable degradation in the system success-rate. This drop in the success-rate may become apparent when there are an unusually large number of documents for which manual entry of data is required. The request for a summary may also be made in the course of normal system monitoring. Further discussion of information included in each of these reports is provided with FIG. 12.

After the analysis request has been made, Operation 94 creates a temporary file with accumulated summary of audit information. The particular processing involved in creating the temporary file is discussed in greater detail in the description accompanying Appendix A.

Once data from the Audit File has been accumulated in the temporary file, it is sorted as indicated in Operation 96. The sort criteria used in the exemplary system include: 1) Check and Non-check type documents, 2) Unencoded and Preencoded documents, 3) Account No. (for checks), and 4) Document Code (for non-checks). The above sort criteria are applicable to document image processing systems used by banks for check processing, and it will be recognized that other characteristics for different document types could be used without departing from the spirit of the present invention.

After the temporary file is created and sorted, Operation 98 merges the information accumulated in the temporary file with information contained in a History File. The History File stores historical document class summaries which are accumulated from prior document summary requests. The Merge Operation 98 accumulates totals for various document types from the sorted temporary file to create a summary for each document class. These totals are then combined with the totals for the various document types which are stored in the History File as a historical document class summary to obtain a new historical document class summary. After combining the totals, the results are selected for the analysis report. The description for FIG. 12 further describes the processing involved in the merge Operation 98.

The final step is displaying a summary containing the information processed, as shown by Operation 100 (see FIG. 12 for information contained in the report). Working from the information contained in the report, the analyst quickly identify particular documents for which the system has had a low success-rate, and thereafter take the appropriate corrective action. For example, the analyst could program (or provide as configuration data) the Image Module 32b to provide the appropriate location parameters for a particular document type to the Courtesy Amount Reader 32c. When the location parameter is provided, the Courtesy Amount Reader can immediately retrieve the desired data from the document image.

Figure 10:
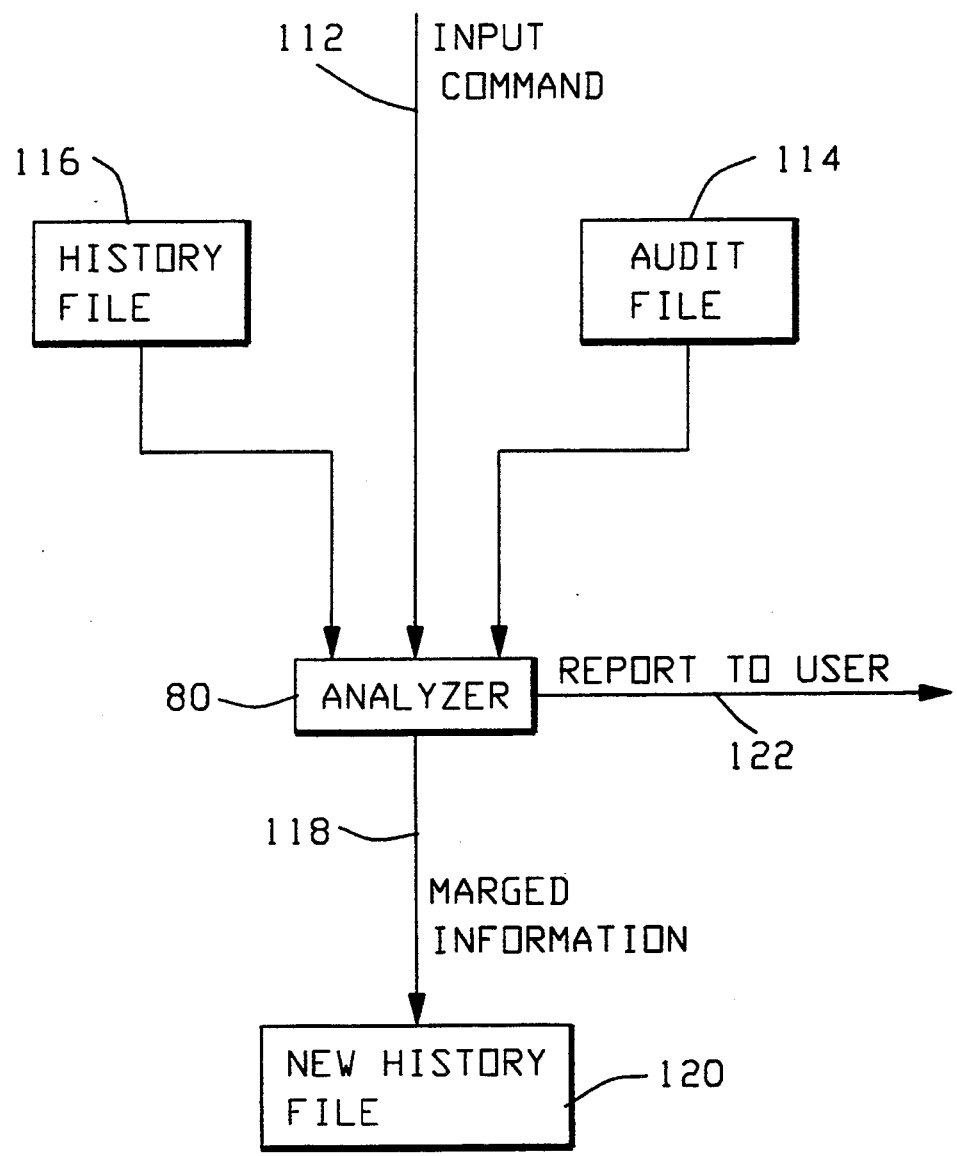
FIG. 10 is a block diagram showing the data processed by the Analyzer.

FIG. 10 is a block diagram showing the data processed by Analyzer 80. The Analyzer 80 is initiated by an Input Command 112 indicating a request for an analysis. The Analyzer creates a temporary file (not shown in this figure) from information stored in the Audit File 114. As discussed above, the Audit File 114 contains document characteristics for each document processed. In particular, the document characteristics stored in the Audit File includes:

Account No.

The Account No. identifies the particular bank and account associated with the document. This data is read from the MICR code line on the document.

Document Code

The Document Code is an identifier for non-check documents processed by the system, such as the Cash Paid Out Slip of FIG. 4. This data is also read from the MICR code line.

Item Type

The Item Type is the type of document processed, either "Check" or "Non-check" for the exemplary system, and is read from the MICR code line.

Work Type

The Work Type is either "Unencoded" or "Preencoded". In the exemplary system this indicates whether or not a MICR amount has been encoded on document.

CAR Status

This indicates whether or not the Courtesy Amount Read was requested for this item and whether the Courtesy Amount Reader was successful in reading the desired data from the document image.

CAR Location

This field indicates the particular coordinates on the document image where the desired data was found by the Courtesy Amount Reader 32c. The CAR Location is returned by the Courtesy Amount Reader 32c after attempting to find and recognize the courtesy amount on the check image. Those skilled in the art will recognize that more than one CAR Location field could be used where there is more than one piece of desired data on the document being read.

CAR Location-Provided Flag

This flag indicates whether or not a location was supplied by the Image Module 32b to the Courtesy Amount Reader 32c.

For the purpose of classifying related documents, the Account No., Document Code, Item Type, and Work Type could be used separately or in combination as document identifiers to establish relationships between the processed documents.

The information in the Audit File 114 can be organized in many different ways in order to achieve substantially the same results. As such, a detailed discussion of the organization of the Audit File is beyond the scope of this invention and will be omitted for the purposes of the present invention.

The History File 116 contains a historical statistical summary of data concerning various document classes processed by the system. In particular, statistics are accumulated for the following four classes of document types:

Unencoded Checks

The Unencoded Check classification includes all documents whose Item Type is check and whose Work Type is unencoded.

Preencoded Checks

The Preencoded Check classification includes all documents whose Item Type is check and whose Work Type is Preencoded.

Unencoded Non-checks

The Unencoded Non-check classification includes all documents whose Item Type is non-check and whose Work Type is unencoded.

Preencoded Non-checks

The Preencoded Non-check classification includes all documents whose Item Type is non-check and whose Work Type is preencoded.

It should be noted that the categories named above are merely illustrative and other classifications could be easily constructed for applications other than the exemplary check processing system.

For each of the classes of documents, Unencoded Checks, Preencoded Checks, Unencoded Non-checks, and Preencoded Non-checks, the History File 116 also stores the following totals:

Class Total

Class Total is the total number of documents within the particular class which have been processed.

CAR Requested Total

This is the total number of documents within the particular class for which the Courtesy Amount Reader 32c was requested to read data from the document image.

CAR Rejected Total

This is the total number of documents within the particular class for which the Courtesy Amount Reader 32c was unable to read the data from the document image.

CAR Success Total

The CAR Success Total is the total number of documents within the particular class for which the Courtesy Amount Reader 32c was able to read to the data from the document image.

CAR Rejected-With-Location-Provided Total

This total is the total number of documents within the particular class for which a location was provided to the Courtesy Amount Reader 32c for locating the desired data on the document image, and for which Courtesy Amount Reader was unable to read the desired data.

Within each classification, the documents are further divided into subclasses according to Account No. and Document Code. The totals kept for each subclass are similar to the totals kept for each class identified above. Statistical data tallied in the History File 116 for each subclass include:

Class Total Since Merged

The Class Total Since Merged is the total number of documents, in the document class of which the subclass is a member, which have been processed since an entry for the document subclass was added to the History File.

Subclass Total

The total documents in a subclass is the total number of documents, for the particular Account No. or Document Code, which have been processed by the system since an entry for the particular document subclass was added to the History File 116.

CAR Requested Total

This total for a subclass is the total number of documents, for the particular Account No. or Document Code, for which the Courtesy Amount Reader 32c was requested to read data from the document images.

CAR Rejected Total

The CAR Rejected Total for a subclass is the total number of documents, for the particular Account No. or Document Code, for which the Courtesy Amount Reader 32c was unable to read the data from the document image.

CAR Success Total

This total for a subclass is the total number of documents, for the particular Account No. or Document Code, for which the Courtesy Amount Reader 32c was successful in reading the data from the document image.

CAR Rejected-With-Location-Provided Total

This total for a subclass is the total number of documents, for the particular Account No. or Document Code, for which a location was provided to the Courtesy Amount Reader 32c for locating the desired data on the document image, and for which the Courtesy Amount Reader was unable to read the desired data.

Location Information

Briefly, this includes a summary of the coordinates on the document images where the desired data was actually found by the Courtesy Amount Reader 32c for all the documents within a subclass. A more detailed discussion is provided with the description of FIG. 11b.

Due to the nature of the exemplary check processing system, where documents processed number in the millions, it has been deemed beneficial to only include totals for in the History File 116 those subclasses whose Total Items meet a predetermined threshold. Other selection criteria may apply to systems processing different document types.

As stated above, the Analyzer 80, upon request, reads the information stored in the Audit File 114, creates a temporary file and merges the temporary file with information stored in the History File 116. The merged results are written to a New History File 120 which then becomes the History File 116 for future requests to the Analyzer when the merge is complete.

Output Line 122 represents the report generated by the Analyzer 80. Such report could either be displayed to an analyst on a Video Display Terminal (not shown) or provided in hardcopy form. A more detailed discussion of information contained in the report accompanies the description for FIG. 12.

Appendix A contains the psuedo-code processing for the Create temporary file Operation 94. The processing accumulates the necessary information from the Audit File 114 and creates a temporary file which is subsequently merged (See Appendix B) with information in the History File 116. Each of the psuedo-code statements has an associated reference number for the purposes of the following discussion.

Psuedo-code Statement 202 indicates that each record in the Audit File 114 is to be processed. Statement 204 begins with reading a record from the Audit File 114. Once the record is read, Statement 206 specifies copying the desired information from the Audit record to a temporary record which will be written to the temporary file. In particular, the Item Type, Work Type, CAR Results, CAR Status, CAR Location, and CAR Location-Provided Flag are copied from the Audit record to the temporary record. Statements 208 and 210 specify copying the Account No. for Item Types equal to "check" and Document Code for Item Types not equal to "check" to the temporary record from the Audit record.

During creation of the temporary file, statistics are tallied for each class of documents according to the Work Type and Item Type indicated by the Audit record. Each class has a Class Total, CAR Requested Total, CAR Rejected Total, CAR Success Total, and CAR Rejected-With-Location-Provided Total, each of which is conditionally incremented. Statement 212 specifies that for the appropriate class, meaning the class which matches that indicated by the Audit record, various totals are incremented. Specifically, statement 214 specifies that the Class Total, associated with the class indicated in the Audit record, is incremented. Conditional Statement 216 checks whether the CAR Status in the Audit record indiates that the Courtesy Amount Reader 32c was requested for the image associated with this Audit record. If the test of Statement 216 evaluates to true, the CAR Requested Total is incremented as indicated in Statement 218.

Conditional Statement 220 tests whether the CAR Status in the Audit record indicates that the Courtesy Amount Reader 32c failed to read the data from the document. As indicated in Statement 222, the CAR Rejected Total is incremented if the test of Statement 220 evaluates to true.

Tested at conditional Statement 224 is whether the CAR Status in the Audit record indicates that the Courtesy Amount Reader 32c successfully read the item. Statement 226, incrementing the CAR Success Total, is conditionally performed based upon the results of the test in Statement 224.

Conditional Statement 228 tests whether the CAR Status in the Audit record indicates that the Courtesy Amount Reader 32c was unable to read the data from the document image, and whether the CAR Location-Provided Flag indicates that the Image Module 32b provided a location to the Courtesy Amount Reader 32c where the data was expected to be located in the document image. If the test of conditional Statement 228 evaluates to true, Statement 230 specifies that the CAR Rejected-With-Location-Provided Total is incremented.

After the totals are accumulated, Statement 232 directs that the temporary record is to be written to the temporary file.

Statement 234 specifies that for each of the document classes, the operation specified in Statement 236 is to be performed. Namely, for each document class, a record containing the class totals accumulated in Statements 214 through 230 is to be added to the temporary file. The class total records added to the temporary file includes information such that after sorting the temporary file, the class total records appear first in the temporary file. This could be accomplished by either assigning a string of "0"s or space characters to the Account No. and Document Code fields.

As indicated in FIG. 9, after the temporary file is created 94, it is sorted according to Operation 96. Having previously described the sort criteria, those skilled in the art will recognize that various methods, which are equally suitable, are available for accomplishing the task. Thus, a more detailed discussion of the Sort Operation 96 is ommitted for the purposes of the present invention.

The psuedo-code processing for merging (Operation 98 of FIG. 9) the information in the sorted temporary file with the statistical data in the History File 116 will be discussed with reference to Appendix B. As described above, the records in the temporary file are sorted according to Item Type, Work Type, Account No., and Document Code such that all records having a particular Account No. and sharing a common Work Type and Item Type are grouped together. As should be remembered from the discussion pertaining to the information stored in the History File 116, the aforementioned groupings refer to "subclasses" of document types. It will also be remembered that the four "classes" of documents in the exemplary system include: unencoded checks, preencoded checks, unencoded non-checks, and preencoded non-checks.

Statement 300 indicates that the class totals for the current analysis are read from the temporary file. Following which, Statement 301 specifies reading the class total records from the History File 116, adding the class totals for the current analysis to the class totals stored in the History File 116, and writing a record containing the new class totals to the New History File 120.

Statement 302 specifies that for each possible subclass, the processing set forth in the psuedo-code statements which follow should occur. Beginning with Statement 304, all records which match the chosen subclass are read from the temporary file. While reading the matching records from the temporary file, Statement 306 directs that certain totals should be tallied. In particular, for each subclass the following totals are accumulated: CAR Enabled Total, CAR Requested Total, CAR Success Total, CAR Rejected Total, CAR Success Total, CAR Rejected-With-Location-Provided Total, and Location Information. For all totals, except the Location Information, the significance of each has been discussed previously and needs no further explanation.

Figure 11A:
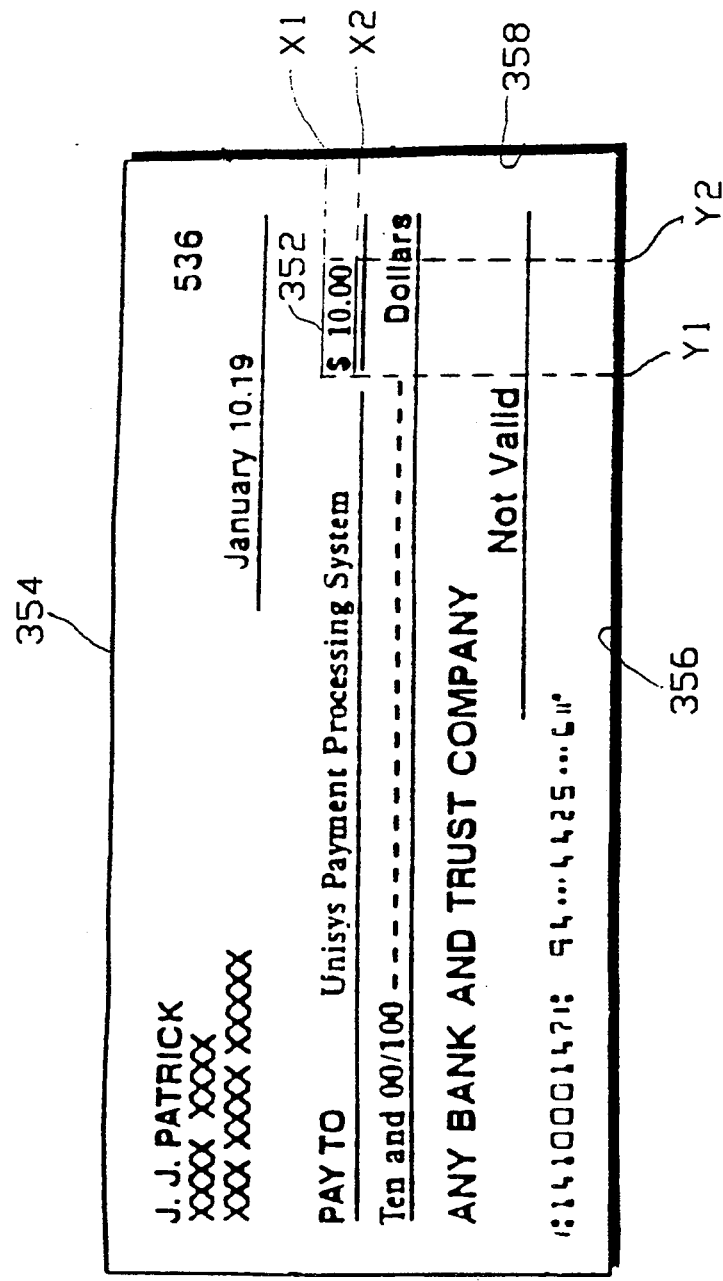
FIG. 11a shows the front side of a typical check along with the location information pertaining to the courtesy amount.
Figure 11B:
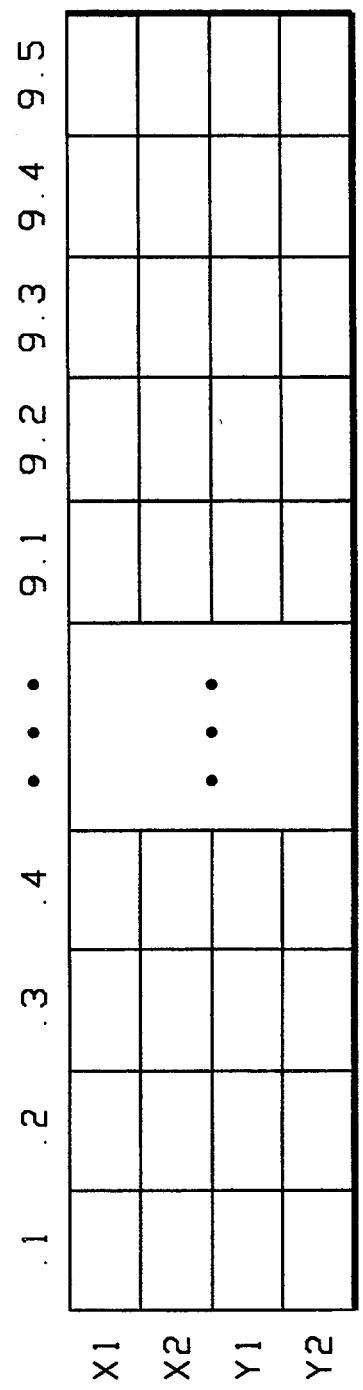
FIG. 11b illustrates how the location information for a particular subclass is stored in the History File 116.

Departing for the moment from the discussion of Appendix B, the location information will be described with reference to FIG. 11a and FIG. 11b. FIG. 11a shows the front side of a typical check along with the location information pertaining to the courtesy amount. FIG. 11b illustrates how the location information for a particular subclass is stored in the History File 116. In reference to FIG. 11a, Box 352 is drawn around the courtesy amount "$10.00" to indicate the rectangular area within the Document Image 354 in which the courtesy amount is located. The rectangular region is defined by two horizontal lines, X1 and X2, which are parallel to the Bottom Edge 356 of the Document Image 354, and two vertical lines, Y1 and Y2, which are parallel to the Right Edge 358 of the Document Image. The X1 line is referred to as the "uppermost" location at which couresty amount data was located relative to the Bottom Edge 356 of the Document Image 354, and the X2 line is referred to as the "lowermost" location at which courtesy amount data was located relative to the Bottom Edge. Similarly, the Y1 line is referred to as the "leftmost" location at which the courtesy amount data was located relative to the Right Edge 358 of the Document Image 354, and the Y2 line is referred to as the "rightmost" location. After reading the courtesy amount, the Courtesy Amount Reader 32c returns four values which define the X1, X2, Y1, and Y2 lines. These values are ultimately stored in the Audit File 114 as discussed earlier.

Turning to FIG. 11b, the accumulated location values, as specified by Statement 306 in Appendix B, are stored in a Location Table. Each entry in the Location Table contains a total of the number of images, for a particular document subclass, processed by the Courtesy Amount Reader where the location value is equal to that defined by the row and column designation in the table. For example, the entry in the table identified by row X1 and column 9.1 contains the total number of documents, within the particular subclass, where the X1 value (uppermost location) returned by the Courtesy Amount Reader 32c was 9.1 inches from the Bottom Edge 356 of the image. Similarly, the table entry identifed by row Y2 and column 0.4 identifies the total number of documents, within the particular subclass, where the Y2 value (rightmost location) returned by the Courtesy Amount Reader 32c was 0.4 inches from the Right Edge 358 of the image. Similar accumulation is done for the X2 (lowermost location) and Y1 (leftmost location) rows in the table. Thus, when accumulating the Location Information for a particular subclass, the appropriate table entries are incremented according to the X1, X2, Y1, and Y2 location values from the CAR Location information in the temporary file record. The accumulated Location Information stored in the History File 116 is also referred to as the Historical Location Information. The result of merging the Historical Location Information with the location information from the temporary file is called the New Historical Location Information which is stored in the New History File 120.

Returning to Appendix B, after reading and accumulating the information for a particular subclass, Statement 308 provides for reading the record from the History File 116 which matches the subclass currently being processed. Statement 310 specifies that for each record read from the History File 116 which does not match a subclass in the temporary file, the processing specified in Statement 311 should be performed. Processing included in Statement 311 includes adding the Class Total for the appropriate document class to the Class Total Since Merged for the non-matching subclass, and writing the updated record to the New History File 120.

Conditional Statement 312 dictates that if there is a record in the History File which matches the document subclass being processed, then the operations specified in Statements 314 through 320 are performed. Statement 314 specifies adding the Class Total and the totals accumulated at Statement 306 to the totals present in the record read from the History File 116. The Class Total is added to the Class Total Since Merged for the particular subclass. The record with the updated totals is then written to the New History File 120, as indicated by Statement 316.

Conditional Statement 318 tests whether the request from Operation 92 of FIG. 9 is for a history report and whether the Subclass Total accumulated from the temporary file and History File 116 divided by the Class Total accumulated from the temporary file and the History File 116 exceeds a predetermined threshold. This predetermined threshold is called the print threshold and is predefined by the analyst to determine when information for a particular subclass of documents is added to the report. If the condition evaluates to true, Statement 320 is performed. Statement 320 specifies copying the accumulated information (information from Statement 314) to a report data structure so that the results can be provided to the analyst when the processing is complete. The content of the report is discussed in greater detail along with Appendix A.

If the conditions set forth in Statement 312 evaluate to false, namely, there is no record in the History File 116 for the document subclass being processed, then conditional Statement 326 evaluates whether a new record should be added to the New History File for the document subclass. The test specified in Statement 326 is whether the total number of items for a document subclass (as accumulated at Statement 306) as a percentage of the Class Total exceeds the merge threshold. In particular, is (Subclass Total accumulated from the temporary file/Class Total accumulated from the temporary file) * 100% > the merge threshold. If the test is true, then the operations specified in Statements 328 and 330 should be performed. Statement 328 specifies writing a new record to the New History File 120 with the totals accumulated for the document subclass. It should be noted that the Class Total Since Merged for the new subclass record added to the New History File 120 takes the appropriate Class Total. After the new record is written, the processing directed by Statement 330 directs copying the accumulated information (information stored in the New History File 120) to a report data structure so that the results can be provided to the analyst when the processing is complete.

FIG. 12 is the report format showing statistical data for certain subclasses of documents processed by the exemplary system. As indicated by Header 402, this sample report format is for documents whose Item Type is check. A similar report is generated in the exemplary system for non-check documents. As indicated by Headers 404 and 406, the format of the report is further broken down according to documents of unencoded Work Type and documents of encoded Work Type. Under each Work Type are the document subclasses defined by the Account No. 408. In a report for non-check documents (not shown), the subclass would be defined by the Document Code as opposed to the Account No. for checks.

Column 410 is the total number of items for the document subclass which have been processed since data for the document subclass was first stored in the History File 116. This is the Subclass Total discussed above. The total number of documents (within the class of which the subclass is a member), processed by the system since information for the subclass was entered into the History File 116 (Class Total Since Merged), is contained in Column 412. For the classes shown in this report, this would be the respective totals for unencoded checks and encoded checks. Column 414 is the percentage of documents within the document class that are members of the document subclass defined by the Account No. Specifically, the data in Column 414 is:

(Column 410 data/Column 412 data) * 100%

The number of items in the document subclass for which the Courtesy Amount Reader 32c was requested is displayed in Column 416. This is equal to the CAR Requested Total for a subclass which is stored in the History File 116. Column 418 is the percentage of items in the document subclass for which the Courtesy Amount Read was requested and which resulted in a successful Courtesy Amount Read. Specifically, the data in Column 418 is:

(CAR Success Total/CAR Request Total) * 100%

The percentage of items in a document subclass for which the Courtesy Amount Read was requested and which the Courtesy Amount Reader 32c failed to read the desired data is displayed in Column 420. Column 420 data is:

(CAR Rejected Total/CAR Request Total) * 100%

Column 422 contains a CAR rejected-with-location provided summary which is the percentage of items in a document subclass for which the Courtesy Amount Reader 32c was requested to read data from an image and for which a location provided to the Courtesy Amount Reader 32c for locating the desired data, and the Courtesy Amount Reader failed to read the desired data. In particular, column 420 data is:

(CAR Rejected-With-Location-Provided-Total/CAR Rejected Total) * 100%

If the summary displayed is the result of a daily report, then the CAR rejected-with-location-provided summary 422 is derived from a summary of the pertinent information from the Audit File 114. If the summary displayed is the result of a history report, then the CAR rejected-with-location-provided summary 422 is a historical rejected-with-location-provided summary which is derived from the merging CAR Rejected-With-Location-Provided-Total from the History File 116 and the CAR Rejected-With-Location-Provided-Total accumulated from the Audit File 114.

The location where the data on documents in a particular document subclass was found by the Courtesy Amount Reader 32c is displayed in Column 424. Four items of data are provided with respect to the data location. The first item is the upper-most location where data was found on a document image for the document subclass as indicated by Column 426; second is the lower-most location as indicated by Column 428; third is the left-most location as indicated by Column 430; and fourth is the right-most location as indicated by Column 432.

The data for each of the Columns 426, 428, 430, and 432 is determined by examining the Location Information stored in the History File 116 for a document subclass. The uppermost data in Column 426 is the column heading in the Location Table FIG. 11b having the greatest value and which has a non-zero table entry for the X1 row. The lowermost data in Column 428 is the column heading in the location table having the least value and which has a non-zero table entry for the X2 row. Similarly, the leftmost data in Column 430 is the column heading in the location table having the greatest value and which has a non-zero table entry for the Y1 row. And finally, the rightmost data in Column 432 is the column heading in the location table having the least value and which has a non-zero table entry for the Y2 row.

The CAR Location Data 424 displayed will depend upon whether a daily report or a historical report has been summarized. If the report is a daily report, then the uppermost, lowermost, leftmost, and rightmost locations are derived from summarizing location information in the Audit File 114. If the report is a historical report, then a historical uppermost, historical lowermost, historical leftmost, and historical rightmost location is displayed as derived by merging the location information from the Audit File 114 with the historical location information from the History File 116.

After analyzing the information contained in the report of FIG. 12, an analyst can provide the appropriate configuration data to the Image Module 32b for purposes of enhancing the performance of the Courtesy Amount Reader 32c. For instance, if an entry in Column 422 is relatively high, the analyst may conclude that the location information supplied by the Image Module 32b to the Courtesy Amount Reader 32c is, in a significant number of instances, incorrect. A reason for this may be that the format for the checks corresponding to the identified Account No. has changed and the courtesy amount has been moved to a different location on the check. If this is the case, the analyst could then change the configuration data that the Image Module 32b stores for the documents associated with the Account No., and the Image Module could thereafter supply the correct location parameters to the Courtesy Amount Reader 32c.

The information provided in the report could further be used to verify that the location parameters supplied to the Courtesy Amount Reader 32c defines an area sufficient to cover all variations that can exist for a particular subclass of checks. If the current location parameters supplied to the CAR 32c are too close to the location information displayed in the report and the amounts on a significant number of documents are not successfully read, then the location parameters could be adjusted to define a search area as indicated in the report.

It should be noted that while the foregoing description is based on an Audit File 114 which contains data relating to images processed by the document image processing system of FIG. 6, those skilled in the art will recognize that the invention could be applied to Audit Files generated before the installation of the automatic courtesy amount read capability to the processing of checks. In particular, before a bank adds the automatic courtesy amount read capbility to its check processing system, it would be beneficial to identify those accounts on which a relatively large number of check are drawn. Once identified, the checks for the identified accounts could be examined to determine the location of the courtesy amount on the check. Then, when the automatic courtesy amount read capability is added to the processing of checks, location information can be provided to the Courtesy Amount Reader 32c for the accounts identified.

While the present invention has been discussed in terms of a check processing system and the recording and reporting of location information where the amount on a check was found, it should be understood that image systems that process documents other than checks, and document characteristics other than data location information could be substituted without departing from the spirit from the present invention. Having described an exemplary system in which the present invention could be used and the preferred embodiment for the invention, those skilled in the art will recognize that alternate embodiments exists which fall within the scope and spirit of the claims set forth below.

| | APPENDIX A: Create Temporary File |
|---|---|
| 202 | FOR each record in the Audit File 114 |
| 204 | READ the record |
| 206 | COPY Item Type, Work Type, CAR Results, CAR Status, CAR Location, and the CAR Location Flag from the record read from the audit file to a temporary record |
| 208 | COPY the Account No. from the audit record read to the temporary record for Item Type = check |
| 210 | COPY other identifier information from the audit record read to the temporary record for Item Type < > check |
| 212 | FOR the appropriate class of documents: unencoded check, preencoded check, unencoded non-checks, and preencoded non-checks {note that there is a separate total for each of the classes} |
| 214 | INCREMENT the Class Total |
| 216 | IF the CAR Status indicates that the CAR was requested for this item THEN |
| 218 | INCREMENT the CAR Requested Total |
| 220 | IF the CAR Status indicates that the CAR rejected this item THEN |
| 222 | INCREMENT the CAR Rejected Total |
| 224 | IF the CAR Status indicates that the CAR successfully read the item THEN |
| 226 | INCREMENT the CAR Success Total |
| 228 | IF the CAR Status indicates that the CAR rejected the item and the CAR Location Flag indicates that a location was provided THEN |
| 230 | INCREMENT the CAR Rejected With Location Provided Total |
| 232 | WRITE the temporary record to the temporary file |
| 234 | FOR each of the document classes |
| 236 | WRITE a record containing the corresponding totals to the temporary file |

| | APPENDIX B: Merge |
|---|---|
| 300 | READ the class total records from the temporary file |
| 301 | READ the class total records from the History File 116, ADD the class totals read from the temporary file, and WRITE the updated class total records to the New History File 120 |
| 302 | FOR each document subclass |
| 304 | READ from the temporary file all records which match the document subclass; and |
| 306 | ACCUMULATE the following data for the document subclass: Subclass Total, CAR Requested Total, CAR Success Total, CAR Rejected Total, CAR Success Total, CAR Rejected With Location Provided Total, and Location information |
| 308 | READ the record from the History File 116 which matches the document subclass currently being processed; and |
| 310 | FOR any non-matching records encountered |
| 311 | ADD the Class Total to the Class Total Since Merged, and WRITE the updated record to the New History File 120 |
| 312 | IF there is a record in the History File 116 for this document subclass THEN |
| 314 | ADD the Class Total and the totals from the subclass information accumulated from the temporary file to corresponding totals in the record read from the History File 116 |
| 316 | WRITE the updated record to the New History File 120 |
| 318 | IF the request is for a history report AND ((accumlated history Subclass Total)) / (accumulated history Class Total)) * 100% exceeds the print threshold THEN |
| 320 | COPY the accumlated history data to a report |
| 326 | ELSE IF ((Subclass Total from the temporary file) / (Class Total from the temporary file)) * 100% exceeds a merge threshold THEN |
| 328 | WRITE a record with the following document subclass information to a new entry in the New History File 120: |

| APPENDIX B: Merge | |
|---|---|
| | Class Total Since Merged, Subclass Total, CAR Requested Total, CAR Success Total, CAR Rejected Total, CAR Success Total, CAR Rejected Wtih Location Provided Total, and Location Information |
| 330 | COPY the totals accumlated at Statement 306 to a report |

What is claimed is:

1. In a document image processing system, wherein a digitized image of each document is formed and a courtesy amount reader searches for predetermined data on the image and performs character recognition on the predetermined data, wherein document characteristics are associated with each of the documents processed by the system, and the document characteristics include an account identifier, a data area on the image in which the predetermined data was found by the courtesy amount reader, a location-status indicating whether the predetermined data was found at the location where the predetermined data was expected to be located, and a success-status indicating whether the courtesy amount reader was successful in reading the predetermined data, a method for tracking and analyzing document characteristics of all documents processed by the document image processing system, comprising the steps of:

archiving the document characteristics for each document processed by the document image processing system, wherein said archiving is performed after the image has been processed by the courtesy amount reader, whereby the document characteristics from said archiving step are available for analysis after the documents and their associated images are no longer available for analysis;

providing a summary of the document characteristics from said archiving step, wherein said summary includes a summary of the data areas for each account identifier;

merging said summary with a historical summary to obtain a new historical summary, wherein said historical summary contains an accumulation of prior said summaries and said new historical summary becomes said historical summary for subsequent merging steps;

wherein said summary of the data areas includes an uppermost location, a lowermost location, a leftmost location, and a rightmost location for each account identifier, wherein said uppermost location, said lowermost location, said leftmost location, and said rightmost location for each account identifier define the outer boundaries of the data area in which the predetermined data was found for all the documents processed having the same account identifier; and said historical summary includes a historical-uppermost location, a historical-lowermost location, a historical-leftmost location, and a historical-rightmost location, wherein said historical-uppermost location is an accumulation of said uppermost locations, said historical-lowermost location is an accumulation of lowermost locations, said historical-leftmost location is an accumulation of said leftmost locations, and said historical-rightmost location is an accumulation of said right most locations from one or more prior said summaries.

2. The method of claim 1, wherein:

the document characteristics from said archiving step further include a location-provided flag, wherein said location-provided flag indicates whether an expected location was provided to the courtesy amount reader for searching for the predetermined data;

said summary further includes a rejected-with-location-provided summary, wherein said rejected-with-location-provided summary is a summary of the documents for each account identifier where the success-status indicates a failure to successfully read the predetermined data and said location-provided flag indicates that an expected location was provided to the courtesy amount reader; and said historical summary further includes a historical rejected-with-location-provided summary, wherein said historical rejected-with-location-provided summary is an accumulation of one or more prior said rejected-with-location-provided summaries.

* * * * *